(12) United States Patent
Ma et al.

(10) Patent No.: US 11,067,742 B2
(45) Date of Patent: Jul. 20, 2021

(54) BACKLIGHT MODULE, DISPLAY DEVICE, AND METHOD FOR MANUFACTURING BACKLIGHT MODULE

(71) Applicant: BOE TECHNOLOGY GROUP CO., LTD., Beijing (CN)

(72) Inventors: Yongda Ma, Beijing (CN); Yong Qiao, Beijing (CN); Xinyin Wu, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 149 days.

(21) Appl. No.: 16/337,305

(22) PCT Filed: Nov. 8, 2018

(86) PCT No.: PCT/CN2018/114539
§ 371 (c)(1),
(2) Date: Mar. 27, 2019

(87) PCT Pub. No.: WO2019/184369
PCT Pub. Date: Oct. 3, 2019

(65) Prior Publication Data
US 2020/0393612 A1 Dec. 17, 2020

(30) Foreign Application Priority Data
Mar. 29, 2018 (CN) .......................... 201820437351.2

(51) Int. Cl.
*F21V 8/00* (2006.01)

(52) U.S. Cl.
CPC .......... *G02B 6/0085* (2013.01); *G02B 6/0031* (2013.01); *G02B 6/0066* (2013.01); *G02B 6/009* (2013.01)

(58) Field of Classification Search
CPC .. G02B 6/0085; G02B 6/0031; G02B 6/0066; G02B 6/009; G02F 1/1336; G02F 1/133615; G02F 1/133628
See application file for complete search history.

(56) References Cited

U.S. PATENT DOCUMENTS

2013/0265520 A1   10/2013  Shimizu
2013/0294052 A1*  11/2013  Chang ................. G02B 6/0085
                                                        362/97.3
(Continued)

FOREIGN PATENT DOCUMENTS

CN    101676769 A    3/2010
CN    202394007 U    8/2012
(Continued)

OTHER PUBLICATIONS

EPO and Google, "Description CN103791311A", Oct. 20, 2020, Patent Translate of CN103791311A to Inventor Suimang SONG published May 14, 2014, Applicant: Xincheng Techology Chengdu Co & Shenzincheng Optoelectronics Shenzhen Co LTD, pp. 1-3.*

(Continued)

*Primary Examiner* — Alan B Cariaso
(74) *Attorney, Agent, or Firm* — The Webb Law Firm

(57) ABSTRACT

The present disclosure provides a backlight module and a display device, and relates to the field of display technology. The backlight module includes: a heat sink located above a backplane for dissipating heat generated by a light source; a reflective member disposed on a side of a light guide plate adjacent to the backplane; and one or more thermal buffer members disposed between the heat sink and the reflective member, wherein a thermal conductivity coefficient of each of the thermal buffer members in a direction perpendicular to a light exiting surface of the backlight module is less than that of the heat sink.

17 Claims, 3 Drawing Sheets

(56) References Cited

U.S. PATENT DOCUMENTS

2014/0340875 A1* 11/2014 Hayashi .............. G02B 6/0088
362/97.1
2015/0124177 A1* 5/2015 Ikuta ................... G02B 6/0088
348/790

FOREIGN PATENT DOCUMENTS

| CN | 103791311 A | 5/2014 |
| --- | --- | --- |
| CN | 105299526 A | 2/2016 |
| CN | 207992647 U | 10/2018 |

OTHER PUBLICATIONS

International Search Report and Written Opinion for International Appl. No. PCT/CN2018/114539, dated Jan. 18, 2019.

\* cited by examiner

BACKLIGHT MODULE, DISPLAY DEVICE, AND METHOD FOR MANUFACTURING BACKLIGHT MODULE

CROSS-REFERENCE TO RELATED APPLICATIONS

The present application is a U.S. National Stage Application under 35 U.S.C. § 371 of International Patent Application No. PCT/CN2018/114539, filed on Nov. 8, 2018, which claims priority to China Patent Application No. 201820437351.2 filed on Mar. 29, 2018, the disclosure of each of which is incorporated by reference herein in entirety.

TECHNICAL FIELD

The present disclosure relates to the field of display technology, and especially to a backlight module and a display device.

BACKGROUND

With the continuous development of liquid crystal display technology, the backlight industry has also been continuously developing. As one of the key components of the liquid crystal display, the light emitting effect of the backlight module will directly affect the display effect of the liquid crystal display.

SUMMARY

According to one aspect of embodiments of the present disclosure, a backlight module is provided. The backlight module comprises: a heat sink located above a backplane for dissipating heat generated by a light source; a reflective member disposed on a side of a light guide plate adjacent to the backplane; and one or more thermal buffer members disposed between the heat sink and the reflective member, wherein a thermal conductivity coefficient of each of the thermal buffer members in a direction perpendicular to a light exiting surface of the backlight module is less than that of the heat sink.

In some embodiments, a thermal conductivity coefficient of a thermal buffer member of the thermal buffer members adjacent to the light source in the direction is less than that of a thermal buffer member of the thermal buffer members away from the light source.

In some embodiments, the heat sink is not in direct contact with the reflective member.

In some embodiments, a first surface of the heat sink adjacent to the reflective member defines at least one first heat dissipating groove, in which at least one of the one or more thermal buffer members is disposed.

In some embodiments, a first surface of the heat sink adjacent to the reflective member defines at least one first heat dissipating groove, wherein the one or more thermal buffer members are disposed between an area of the first surface other than the at least one first heat dissipating groove and the reflective member.

In some embodiments, a second surface of the heat sink away from the reflective member defines a second heat dissipating groove.

In some embodiments, each of the thermal buffer members comprises a thermal barrier coating layer.

In some embodiments, a thermal conductive adhesive tape is disposed between the heat sink and at least one of the backplane or the light source.

In some embodiments, the backplane comprises a body and a bent portion disposed at an end of the body, which define a space for accommodating the heat sink.

According to another aspect of embodiments of the present disclosure, a display device is provided. The display device comprises the backlight module according to any one of above embodiments.

According to still another aspect of embodiments of the present disclosure, a method for manufacturing a backlight module is provided. The method comprises: disposing a heat sink above a backplane, wherein the heat sink is used for dissipating heat generated by a light source; disposing one or more thermal buffer members on a side of the heat sink away from the backplane, wherein a thermal conductivity coefficient of each of the thermal buffer members in a direction perpendicular to a light exiting surface of the backlight module is less than that of the heat sink; and disposing a reflective member on a side of the one or more thermal buffer members away from the heat sink.

In some embodiments, a thermal conductivity coefficient of a thermal buffer member of the thermal buffer members adjacent to the light source in the direction is less than that of a thermal buffer member of the thermal buffer members away from the light source.

In some embodiments, the heat sink is not in direct contact with the reflective member.

In some embodiments, a first surface of the heat sink adjacent to the reflective member defines at least one first heat dissipating groove, in which at least one of the one or more thermal buffer members is disposed.

In some embodiments, a first surface of the heat sink adjacent to the reflective member defines at least one first heat dissipating groove, wherein the one or more thermal buffer members are disposed between an area of the first surface other than the at least one first heat dissipating groove and the reflective member.

In some embodiments, a second surface of the heat sink away from the reflective member defines a second heat dissipating groove.

In some embodiments, each of the thermal buffer members comprises a thermal barrier coating layer.

In some embodiments, a thermal conductive adhesive tape is disposed between the heat sink and at least one of the backplane or the light source.

In some embodiments, the backplane comprises a body and a bent portion disposed at an end of the body, which define a space for accommodating the heat sink.

BRIEF DESCRIPTION OF THE DRAWINGS

The accompanying drawings, which constitute part of this specification, illustrate exemplary embodiments of the present disclosure and, together with this specification, serve to explain the principles of the present disclosure.

The present disclosure can be understood more clearly from the following detailed description with reference to the accompanying drawings, in which.

Figure 1:
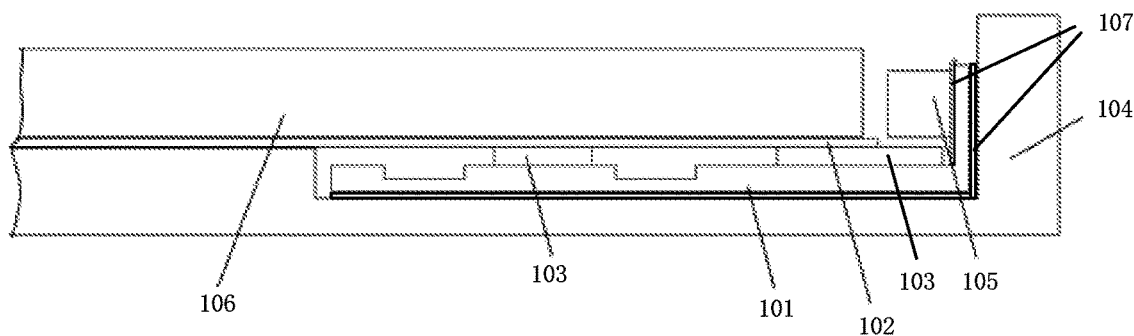
FIG. 1 is a schematic structural view showing a backlight module according to an embodiment of the present disclosure.

It should be understood that the dimensions of the various parts shown in the accompanying drawings are not necessarily drawn according to the actual scale. In addition, the same or similar reference signs are used to denote the same or similar components.

DETAILED DESCRIPTION

Various exemplary embodiments of the present disclosure will now be described in detail with reference to the accompanying drawings. The following description of the exemplary embodiments is merely illustrative and is in no way intended as a limitation to the present disclosure, its application or use. The present disclosure may be implemented in many different forms, which are not limited to the embodiments described herein. These embodiments are provided to make the present disclosure thorough and complete, and fully convey the scope of the present disclosure to those skilled in the art.

It should be noticed that: relative arrangement of components and steps, material composition, numerical expressions, and numerical values set forth in these embodiments, unless specifically stated otherwise, should be explained as merely illustrative, and not as a limitation.

The use of the terms "first", "second" and similar words in the present disclosure do not denote any order, quantity or importance, but are merely used to distinguish between different parts. A word such as "comprise", "have" or variants thereof means that the element before the word covers the element(s) listed after the word without excluding the possibility of also covering other elements. The terms "up", "down", or the like are used only to represent a relative positional relationship, and the relative positional relationship may be changed correspondingly if the absolute position of the described object changes.

In the present disclosure, when it is described that a specific component is disposed between a first component and a second component, there may be an intervening component between the specific component and the first component or between the specific component and the second component. When it is described that a specific part is connected to other parts, the specific part may be directly connected to the other parts without an intervening part, or not directly connected to the other parts with an intervening part.

Unless otherwise defined, all terms (including technical and scientific terms) used herein have the same meanings as the meanings commonly understood by one of ordinary skill in the art to which the present disclosure belongs. It should also be understood that terms as defined in general dictionaries, unless explicitly defined herein, should be interpreted as having meanings that are consistent with their meanings in the context of the relevant art, and not to be interpreted in an idealized or extremely formalized sense.

Techniques, methods, and apparatus known to those of ordinary skill in the relevant art may not be discussed in detail, but where appropriate, these techniques, methods, and apparatuses should be considered as part of this specification.

The inventors have noted that in the related art, the light emitted by the backlight module is not uniform. After further analysis, the inventors have found that the heat sink in the backlight module is in direct contact with the reflective member below the light guide plate with no other member therebetween. This makes the heat of the heat sink be directly transferred to the reflective member, which results in irregular deformation of the reflective member, thereby resulting in nonuniform light emitted by the backlight module.

In order to solve the above problem, the embodiments of the present disclosure provide the following technical solutions.

FIG. 1 is a schematic structural view showing a backlight module according to an embodiment of the present disclosure.

As shown in FIG. 1, the backlight module may comprise a heat sink 101, a reflective member 102, and one or more thermal buffer members 103. It should be understood that, the backlight module may also comprise members such as an optical film and a frame not shown in FIG. 1.

The heat sink 101 is located above the backplane 104 and used for dissipating heat generated by the light source 105. In some embodiments, the heat sink 101 may be a heat dissipating fin. However, the present disclosure is not limited thereto.

In some embodiments, the backplane 104 may comprise a body and a bent portion disposed at an end of the body, which may define a space accommodating the heat sink 101. Such a structure may reduce the thickness of the backlight module. For example, referring to FIG. 1, the body may be a horizontal portion of the backplane 104, and the bent portion may be a vertical portion of the backplane 104. The horizontal portion and the vertical portion may define a space similar to a groove. In some embodiments, a thermal conductive adhesive tape 107 may be disposed between the backplane 104 and the heat sink 101. The thermal conductive adhesive tape 107 facilitates fixing the heat sink 101 on one hand, and may assist in the heat dissipation of the heat sink 101 on the other hand.

The light source 105 may be an edge-type light source disposed at a lateral portion of the light guide plate 106. In some implementations, the light source 105 may comprise, but is not limited to, an LED (Light Emitting Diode) light bar or the like. In one or more embodiments, a thermal conductive adhesive tape 107 is disposed between the light source 105 and the heat sink 101. The thermal conductive adhesive tape 107 facilitates fixing the light source 105 on one hand, and may assist in the heat dissipation of the heat sink 101 on the other hand.

The reflective member 102 is disposed on one side of the light guide plate 106 adjacent to the backplane 104. The reflective member 102 may reflect the light exiting from the light guide plate 106 into the light guide plate 106 to improve the light utilization efficiency. In some embodiments, the reflective member 102 may be a reflective sheet.

The thermal buffer member 103 is disposed between the heat sink 101 and the reflective member 102. The thermal conductivity of the thermal buffer member 103 in a direction perpendicular to a light exiting surface of the backlight module is less than the thermal conductivity of the heat sink 101 in the direction perpendicular to the light exiting surface of the backlight module. In some embodiments, the material of the thermal buffer member may comprise, for example, a composite magnesium aluminum silicate thermal barrier coating, a rare earth thermal insulation coating, or the like.

It should be noted that, the above direction perpendicular to the light exiting surface of the backlight module may also be understood as the direction perpendicular to the light exiting surface of the light guide plate 106 (the upper surface of the light guide plate 106 shown in FIG. 1).

In the backlight module provided by the above embodiments, a thermal buffer member is disposed between the heat sink and the reflective member, so that at least a part of the heat of the heat sink is transferred to the heat buffering member first and then to the reflective member. Since the thermal conductivity of the thermal buffer member in the direction perpendicular to the light exiting surface of the backlight module is less than that of the heat sink, the heat obtained by the reflective member from the heat sink may be reduced, and the deformation of the reflective member due to being heated may be reduced, thereby the uniformity of light emitted by the backlight module may be improved.

It should be understood that, although the surface of the heat sink 101 adjacent to the reflective member 102 shown in FIG. 1 defines a groove, this is merely illustrative and is not intended to limit the present disclosure.

In some embodiments, the backlight module comprises a plurality of thermal buffer members 103, of which, the thermal conductivity coefficient of a thermal buffer member 103 adjacent to the light source 105 in the direction perpendicular to the light exiting surface of the backlight module is less than that of a thermal buffer member 103 away from the light source 105. In this way, the heat transferred to the portion of the reflective member 102 adjacent to the light source 105 is close to the heat transferred to the portion of the reflective member 102 away from the light source 105, so that the reflective member 102 is more uniformly heated, and different positions of the reflective member 102 are more uniformly deformed. Thus the uniformity of light emitted by the backlight module may be further improved.

The backlight modules according to other embodiments of the present disclosure will be introduced below with reference to FIGS. 2 and 3. It should be noted that, in the following description, the differences between the backlight module shown in FIG. 2 and the backlight modules shown FIG. 3 and FIG. 1 will be focused on, and reference may be made to the above description for other identical or similar aspects.

Figure 2:
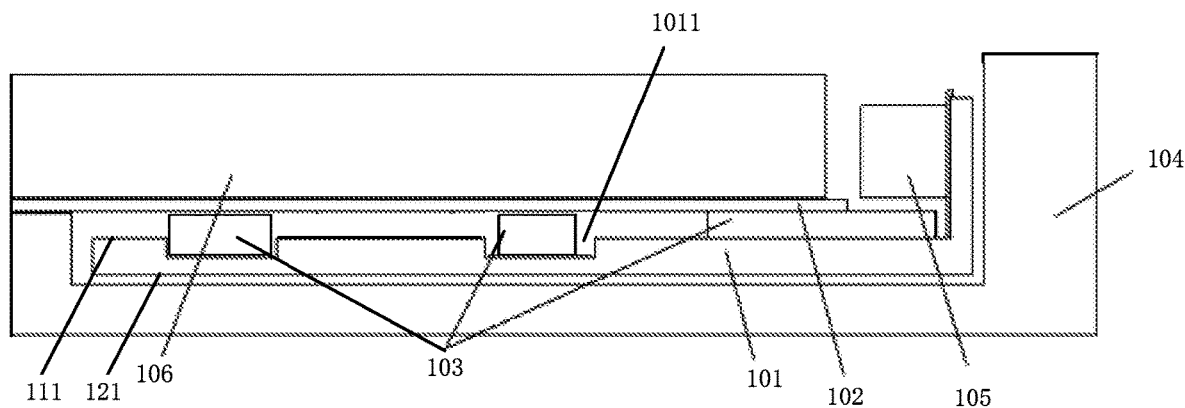
FIG. 2 is a schematic structural view showing a backlight module according to another embodiment of the present disclosure.

FIG. 2 is a schematic structural view showing a backlight module according to another embodiment of the present disclosure.

As shown in FIG. 2, the heat sink 101 has a first surface 111 adjacent to the reflective member 102, and a second surface 121 away from the reflective member 102 and opposite to the first surface 111. The first surface 111 of the heat sink 101 defines at least one first heat dissipating groove 1011. At least one of the one or more thermal buffer members 103 is disposed in the at least one first heat dissipating groove 1011.

In some implementations, a part of the thermal buffer members 103 may be each disposed in one corresponding first heat dissipating groove 1011, and the other thermal buffer members 103 may be disposed between a region of the first surface 111 other than the at least one first heat dissipating groove 1011 and the reflective member 102, as shown in FIG. 2. In other implementations, all of the thermal buffer members 103 may be each disposed in one corresponding first heat dissipating groove 1011.

In the backlight module provided by the above embodiments, at least one thermal buffer member is disposed in the first heat dissipating groove. Given a certain thickness of the backlight module, the thermal buffer member disposed in the first heat dissipating groove may have a greater thickness, which results in less heat transferred to the reflective member, so that the uniformity of light emitted by the backlight module may be further improved.

In some embodiments, the heat sink 101 is not in direct contact with the reflective member 102. In this case, any position of the heat sink 101 is not in direct contact with the reflective member 102. The heat transferred to the reflective member 102 may be further reduced, so that the uniformity of light emitted by the backlight module can be still further improved. In addition, the thermal buffer member 103 in direct contact with the reflective member 102 may function to support the reflective member 102.

Figure 3:
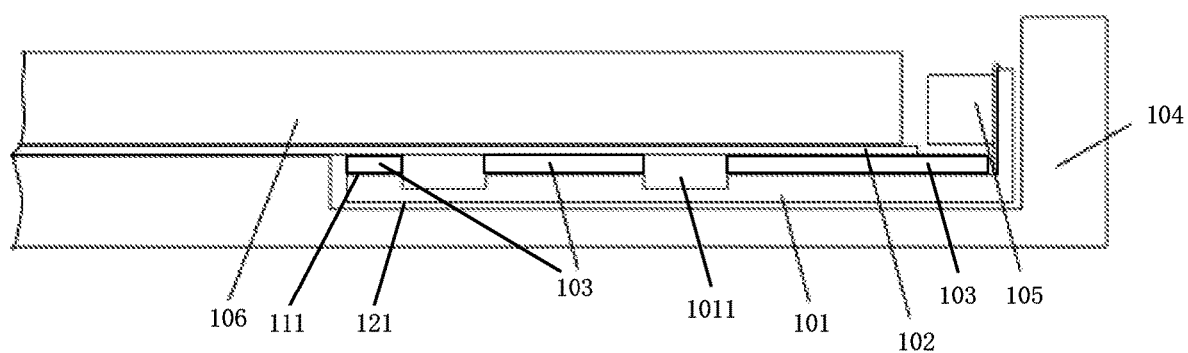
FIG. 3 is a schematic structural view showing a backlight module according to still another embodiment of the present disclosure.

FIG. 3 is a schematic structural view showing a backlight module according to still another embodiment of the present disclosure.

As shown in FIG. 3, the heat sink 101 has a first surface 111 adjacent to the reflective member 102, and a second surface 121 away from the reflective member 102 and opposite to the first surface 111. The first surface 111 of the heat sink 101 defines at least one first heat dissipating groove 1011. All the thermal buffer members 103 are disposed between a region of the first surface 111 other than the at least one first heat dissipating groove 1011 and the reflective member 102. In some embodiments, the thermal buffer member 103 may comprise a thermal barrier coating. The thermal barrier coating may be integrally formed with the heat sink 101, which facilitates maintaining the flatness of the bottom reflective member 102 and reduces the deformation of the bottom reflective sheet 102, so that the uniformity of light emitted by the backlight module can be still further improved.

In one or more embodiments, in the backlight module shown in FIG. 2 or FIG. 3, the second surface 121 of the heat sink 101 away from the reflective member 102 may define a second heat dissipating groove (not shown in the drawings), thereby further facilitating the dissipation of heat of the heat sink 101.

Figure 4:
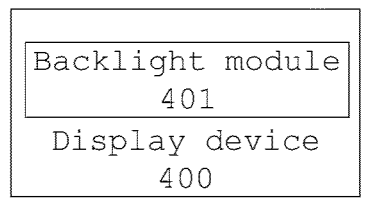
FIG. 4 is a schematic structural view showing a display device according to an embodiment of the present disclosure.

FIG. 4 is a schematic structural view showing a display device according to an embodiment of the present disclosure. As shown in FIG. 4, the display device 400 may comprise the backlight module 401 according to any one of the above embodiments. The display device 400 may be any product or member having a display function, such as a display panel, a mobile terminal, a television, a display, a notebook computer, a digital photo frame, a navigator, or an electronic paper.

Figure 5:
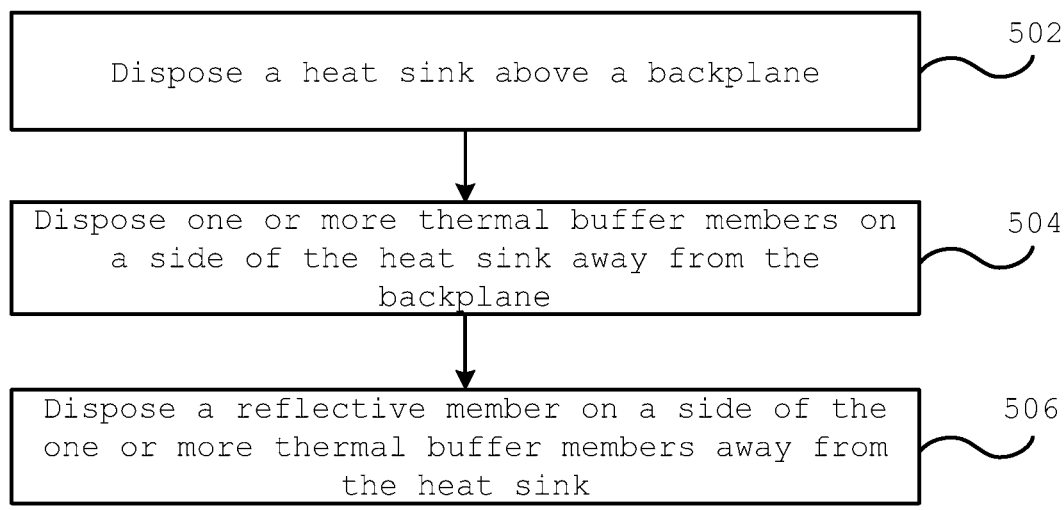
FIG. 5 is a schematic flow chart illustrating a method for manufacturing a backlight module according to an embodiment of the present disclosure.

FIG. 5 is a schematic flow chart showing a method for manufacturing a backlight module according to an embodiment of the present disclosure.

At step 502, a heat sink for dissipating heat generated by a light source is disposed above a backplane.

For example, the heat sink may be a heat dissipating fin. For example, the light source may be an LED light bar.

At step 504, one or more thermal buffer members are disposed on one side of the heat sink away from the backplane. Here, the thermal conductivity of the thermal buffer member in the direction perpendicular to the light exiting surface of the backlight module is less than that of the heat sink.

At step 506, a reflective member is disposed on a side of the one or more thermal buffer members away from the heat sink.

A light guide plate may also be disposed on the reflective member after the reflective member is disposed. Further, an optical film or the like may be disposed on the light guide plate.

In the above embodiment, a thermal buffer member is disposed between the heat sink and the reflective member, so that at least a part of the heat of the heat sink is transferred to the heat buffering member first and then to the reflective member. Since the thermal conductivity of the thermal buffer member in the direction perpendicular to the light exiting surface of the backlight module is less than that of the heat sink, the heat obtained by the reflective member from the heat sink may be reduced, and the deformation of the reflective member due to being heated may be reduced, thereby the uniformity of light emitted by the backlight module may be improved.

Hereto, various embodiments of the present disclosure have been described in detail. Some details well known in the art are not described to avoid obscuring the concept of the present disclosure. According to the above description, those skilled in the art would fully know how to implement the technical solutions disclosed herein.

Although some specific embodiments of the present disclosure have been described in detail by way of examples, those skilled in the art should understand that the above examples are only for the purpose of illustration and are not intended to limit the scope of the present disclosure. It should be understood by those skilled in the art that modifications to the above embodiments and equivalently substitution of part of the technical features can be made without departing from the scope and spirit of the present disclosure. The scope of the disclosure is defined by the following claims.

What is claimed is:

1. A backlight module, comprising:
a heat sink located above a backplane for dissipating heat generated by a light source;
a reflective member disposed on a side of a light guide plate adjacent to the backplane; and
one or more thermal buffer members disposed between the heat sink and the reflective member, wherein a thermal conductivity coefficient of each of the one or more thermal buffer members in a direction perpendicular to a light exiting surface of the backlight module is less than that of the heat sink,
wherein the thermal conductivity coefficient of the thermal buffer member of the one or more thermal buffer members adjacent to the light source in the direct is less than that of the thermal buffer member of one or more thermal buffer members away from the light source.

2. The backlight module according to claim 1, wherein the heat sink is not in direct contact with the reflective member.

3. The backlight module according to claim 1, wherein a first surface of the heat sink adjacent to the reflective member defines at least one first heat dissipating groove, in which at least one of the one or more thermal buffer members is disposed.

4. The backlight module according to claim 3, wherein a second surface of the heat sink away from the reflective member defines a second heat dissipating groove.

5. The backlight module according to claim 1, wherein a first surface of the heat sink adjacent to the reflective member defines at least one first heat dissipating groove, wherein the one or more thermal buffer members are disposed between an area of the first surface other than the at least one first heat dissipating groove and the reflective member.

6. The backlight module according to claim 5, wherein each of the one or more thermal buffer members comprises a thermal barrier coating layer.

7. The backlight module according to claim 1, wherein a thermal conductive adhesive tape is disposed between the heat sink and at least one of the backplane or the light source.

8. The backlight module according to claim 1, wherein the backplane comprises a body and a bent portion disposed at an end of the body, which define a space for accommodating the heat sink.

9. A display device, comprising: the backlight module according to claim 1.

10. A method for manufacturing a backlight module, comprising:
disposing a heat sink above a backplane, wherein the heat sink is used for dissipating heat generated by a light source;
disposing one or more thermal buffer members on a side of the heat sink away from the backplane, wherein a thermal conductivity coefficient of each of the one or more thermal buffer members in a direction perpendicular to a light exiting surface of the backlight module is less than that of the heat sink; and
disposing a reflective member on a side of the one or more thermal buffer members away from the heat sink,
wherein the thermal conductivity coefficient of the thermal buffer member of the one or more thermal buffer members adjacent to the light source in the direct is less than that of the thermal buffer member of one or more thermal buffer members away from the light source.

11. The method according to claim 10, wherein the heat sink is not in direct contact with the reflective member.

12. The method according to claim 10, wherein a first surface of the heat sink adjacent to the reflective member defines at least one first heat dissipating groove, in which at least one of the one or more thermal buffer members is disposed.

13. The method according to claim 12, wherein a second surface of the heat sink away from the reflective member defines a second heat dissipating groove.

14. The method according to claim 10, wherein a first surface of the heat sink adjacent to the reflective member defines a first heat dissipating groove, wherein the one or more thermal buffer members are disposed between an area of the first surface other than the at least one first heat dissipating groove and the reflective member.

15. The method according to claim 14, wherein each of the one or more thermal buffer members comprises a thermal barrier coating layer.

16. The method according to claim 10, wherein a thermal conductive adhesive tape is disposed between the heat sink and at least one of the backplane or the light source.

17. The method according to claim 10, wherein the backplane comprises a body and a bent portion disposed at an end of the body, which define a space for accommodating the heat sink.

* * * * *